US010269060B2

(12) United States Patent
Kotabe

(10) Patent No.: US 10,269,060 B2
(45) Date of Patent: Apr. 23, 2019

(54) INTERNET DIRECT-SALES SYSTEM USING MERCHANDISE EXHIBITION BOX HAVING LIVE CAMERA

(71) Applicant: Tsukuba Multimedia Co., Ltd., Tsukuba-shi, Ibaraki (JP)

(72) Inventor: Fumihiko Kotabe, Tsukuba (JP)

(73) Assignee: Tsukuba Multimedia Co., Ltd., Tsukuba-shi (JP)

( * ) Notice: Subject to any disclaimer, the term of this patent is extended or adjusted under 35 U.S.C. 154(b) by 295 days.

(21) Appl. No.: 15/409,095

(22) Filed: Jan. 18, 2017

(65) Prior Publication Data
US 2018/0025414 A1    Jan. 25, 2018

(30) Foreign Application Priority Data

Jul. 20, 2016 (JP) ................................ 2016-142127

(51) Int. Cl.
G06Q 30/00    (2012.01)
G06Q 30/06    (2012.01)
H04L 29/08    (2006.01)

(52) U.S. Cl.
CPC ....... *G06Q 30/0643* (2013.01); *H04L 67/025* (2013.01); *H04L 67/02* (2013.01)

(58) Field of Classification Search
CPC .... G06Q 30/0643; H04L 67/02; H04L 67/025
USPC ............................... 705/27.2, 27.1
See application file for complete search history.

(56) References Cited

U.S. PATENT DOCUMENTS

| 8,924,261 B2 * | 12/2014 | Stinchcomb ........... G06Q 30/06 705/26.1 |
| 2001/0044751 A1 * | 11/2001 | Pugliese, III .......... G06Q 30/02 705/14.1 |
| 2006/0095949 A1 * | 5/2006 | Whish-Wilson ........................... H04N 1/00204 725/105 |

FOREIGN PATENT DOCUMENTS

| JP | 2006-226286 | * | 3/2006 | ............ H04N 7/173 |
| JP | 3978432 B2 | | 9/2007 | |
| JP | 2010-C28734 | * | 3/2010 | ............ G06F 13/00 |
| JP | 4477653 B2 | | 6/2010 | |

* cited by examiner

*Primary Examiner* — Yogesh C Garg
(74) *Attorney, Agent, or Firm* — Crowell & Moring LLP

(57) ABSTRACT

{Problems to be Solved}
To provide support in the mail-order sales for a merchandise provider who has no shops by relaying the live camera video of the merchandise over the Internet and by voice inputting.
{Means for Solving the Problem}
On reception of an application for a mail-order purchase from a user computer terminal, a web server delivers, to the user computer terminal, a video taken by web camera, a voice input in microphone, and merchandise information converted from the voice input, and processes matters related to the mail-order received from the user computer terminal. An administrator computer terminal registers, in the web server, merchandise accommodated in a live box placed at a freely-chosen place as an object of mail order sales, provides, to the user computer terminal, omnidirectional video of the objective merchandise and voice in real time in accordance with the instruction given by the user computer terminal, and thereby, supports the mail-order operated by a merchandise provider with no literacy of computer.

5 Claims, 11 Drawing Sheets

INTERNET DIRECT-SALES SYSTEM USING MERCHANDISE EXHIBITION BOX HAVING LIVE CAMERA

TECHNICAL FIELD

The present invention relates to an internet direct-sales system using a portable merchandise exhibition box having a live camera. The system supports a merchandise provider who has no shops or who is not able to process the merchandise image and to enter the texts due to lack of computer literacy in terms of operating mail-order sales over the Internet; the system supports also a merchandise provider who operates mail-order sales over the Internet but needs to handle on the spot the information related to merchandise in the shop for a special sale or a limited-time sale.

BACKGROUND OF THE INVENTION

In order to promote sales of merchandise at shops such as direct-sales shops of agricultural products, a system has been developed that relays images of merchandise to be sold using live cameras; the system allows recognizing subject merchandise on the video of merchandise, and enables mail-order sales and advertisement display. It should be noted that Patent Literature 1 has disclosed a shopping system with a shop display type web camera; and Patent Literature 2 has disclosed a shopping system with a shop shelf type web camera.

{Patent Literature 1} Japanese Patent No. 3978432
{Patent Literature 2} Japanese Patent No. 4477653

SUMMARY OF THE INVENTION

Problems to be Solved by the Invention

However, in the inventions described in Patent Literature 1 and Patent Literature 2, general customers in a shop taken in the web camera are transmitted via the Internet, thus how to protect their portrait rights and privacy is a problem.

In addition, the inventions described in Patent Literature 1 and Patent Literature 2 have been devised under the situations in which the high-speed line of the Internet was not widespread yet, and they have adopted the coordinate axis method as the recognition technique of objects (merchandise) on the taken video. Use of such technique involves various problems. The problem includes: that re-registration of the merchandise is required when the merchandise display is changed, that the system is not movable because the cameras are fixed on the ceiling, that no services by the system can be available unless the shop place is provided, that installing the system requires wiring works, and that the system is not a portable system.

Further, in the inventions described in Patent Literature 1 and Patent Literature 2, the displayed merchandise is viewed only from the direction of the web camera; therefore, an omnidirectional video of the details of the merchandise including the rear thereof is impossible to view.

There is another problem. In the case of providing the mail-ordering service using web cameras in various places other than a shop, such as for example a bare-earth-floored space, a storehouse, and a plastic greenhouse, there possibly be no lighting facilities; even when lighting is provided, 24-hour lighting can cause increase in the electricity charge.

Originally, in many cases, in the farming villages and fishing villages, farmers and fishermen do not operate a direct-sales shop by themselves. People in such district are mostly elderly person and they lack the computer literacy; therefore, even if they place the merchandise information on their homepage over the Internet, problems arise in that the information placed in the home page will not be updated properly in timely manner. That is, the lack of the computer literacy means that they are unable to do update operation of the homepage such as photographing merchandise, processing the taken image, and entering texts and data.

In addition, it has been experienced that a situation may occur where merchandise cannot be mail-ordered because of shops and computer equipment being lost due to disasters such as tsunamis and floods, even though there is merchandise stock to sell. Even in agricultural products direct-sales shops and supermarket shops, there are cases where it is desired to sell only special sale items for limited-time sale or for clearance-sale. In such case, it is necessary to price the merchandise instantly at the selling spot.

In the Internet mail-order sales, Article 14 of the Japanese Act on Specified Commercial Transactions prohibits an act of attempt to conclude a sales contract or a service contract against the customer's will. The guideline concerning "an act of attempt to conclude a sales contract or a service contract against the customer's will" describes a concrete example of the Internet mail-order sales demanding that a confirmation screen (print screen) should be provided. The confirmation screen is required to display the name and image of merchandise, its unit price, and quantity and total price. That is, mail-order sales based on only images and voices on the Web is contrary to that guidelines.

The Japanese Industrial Standards (JIS)X 8341-3 "Guidelines for Older Persons and Persons with Disabilities—Information and Communications Equipment, Software and Services—Part 3: Web Content" has been established. This standard is to allow all the users including elderly people and people with disabilities to use web contents regardless of terminals, web browsers, assistive technologies, etc. For example, delivery of video and sound, and images are required to be converted their content into texts and served in the speech-read. The World Wide Web Consortium (W3C), which establishes the standard specifications of the web, also announces "Web Content Accessibility Guidelines (WAG)", the guideline concerning accessibility to a web contents.

Thus, an object of the present invention is to provide support in the mail-order sales for a merchandise provider by relaying the live camera video of the merchandise over the Internet and by voice inputting. The merchandise provider includes a merchandise provider who has no shop place, who is not able to do the processing of merchandise image and the entering of texts due to lack of computer literacy with respect to the operating of mail-order sales over the Internet, or who needs to handle on the spot the information related to merchandise in the shop for a special sale or a limited-time sale.

Means of Solving the Problems

To solve the above-stated problems, the present invention has an object to provide an internet direct-sales system using a merchandise exhibition box having a live camera. The system supports mail-order sales operated by a merchandise provider who lacks the computer literacy or supports mail-order sales that uses a portable live camera.

An aspect of the present invention is an internet direct-sales system using a merchandise exhibition box having a live camera, the system includes a user computer terminal for making an application for mail-order purchase via the Internet;

a web camera that takes a video of merchandise based on an instruction received from the user computer terminal via the Internet;

a rotating exhibition table for placing thereon merchandise to be taken by the web camera, wherein the table rotates based on an instruction received from the user computer terminal via the Internet;

a lighting device that emits light based on an instruction received from the user computer terminal via the Internet so as to make it easier to view the merchandise placed on the rotating exhibition table;

a live box having a space for accommodating the merchandise placed on the rotating exhibition table, the live box being for attaching the web camera and the lighting device;

a microphone attached to the live box for receiving an input to record the description and the price of the merchandise on the rotating exhibition table in voice;

a web server that delivers data to the user computer terminal on reception of an application for mail-order purchase from the user computer terminal and performs processing related to the mail-order purchase received from the user computer terminal, wherein the data includes the video of the merchandise taken by the web camera, the sound input from the microphone, and the merchandise information in a text form converted from the voice input; and an administrator computer terminal installed on the live box for checking the result of the processing performed by the web server;

wherein the administrator computer terminal registers merchandise accommodated in the live box placed at a freely-chosen place as an object of the mail-order sales and provides the omnidirectional video of the merchandise and the audio in real time to the user computer terminal in accordance with the instruction from the user computer terminal.

Another aspect of the present invention is characterized in that the configuration of the live box is such that the live box is arranged in plural or the live box is partitioned into a plurality of spaces so that a plurality of merchandise are registered in the web server as objects for mail-order sales.

Still another aspect of the present invention is characterized in that the structure of the live box is such that a part of the side face the box is open.

Further another aspect of the present invention is characterized in that the web server converts the voice input from the microphone into text to create merchandise information and causes the user computer terminal to display the merchandise information together with the video taken by the web camera.

Still more another aspect of the present invention is characterized in that, when the web server receives an instruction for purchasing merchandise from the user computer terminal, the web server acquires an image from the video taken by the web camera and combines the acquired image with the merchandise information to create an order information, and displays the information on the user computer terminal.

Advantageous Effects of the Invention

According to the aspect of the present invention, a support in the mail-order sales can be provided for a merchandise provider by relaying over the Internet a live camera video of the merchandise and by voice inputting. The merchandise provider includes a merchandise provider who has no shop place, who is not able to do the processing of merchandise image and to enter the texts due to lack of computer literacy in terms of the operating of mail-order sales over the Internet, or who needs to handle on the spot the information related to merchandise in the shop for a special sale or a limited-time sale. In addition, because the merchandise is accommodated in a box style narrow space, the portrait right problem can be solved; and the mail-order sales can be carried out by changing the place even when disasters since the system allows moving. Further, since text can be displayed as an object different from the image on the video, this meets the guideline of the accessibility to the web contents specified by JIS or W3C.

Currently, the high-speed line of the Internet spreads widely; this situation allows eased browsing the relayed-video of live camera. The portrait right problem can be technically solved by the technological development. In addition, the invented system allows adding new functions, and is adaptable to devices such as Smartphones and tablets.

MODE OF IMPLEMENTING THE INVENTION

Figure 1:
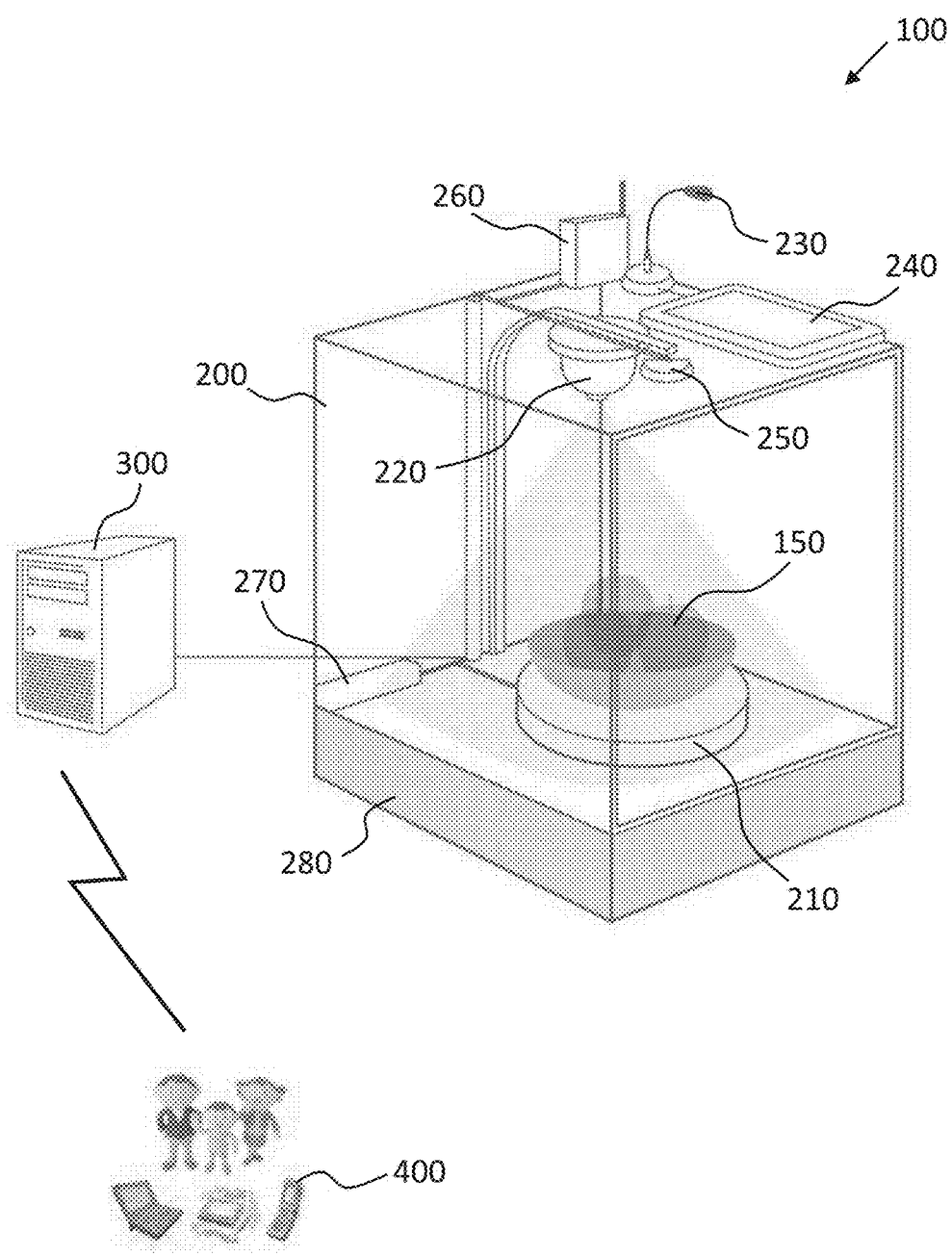
FIG. 1 This is a perspective view to illustrate a configuration of an internet direct-sales system using merchandise exhibition box of a single box style having a live camera of the present invention.

The following provides a detailed description of embodiments of the present invention referring to the drawings. Those having the same function are given the same reference numerals, and repeated explanations thereof may sometimes be omitted.

{Embodiment 1}

First, the configuration of an internet direct-sales system using a merchandise exhibition box having a live camera of the present invention will be described.

Figure 2:
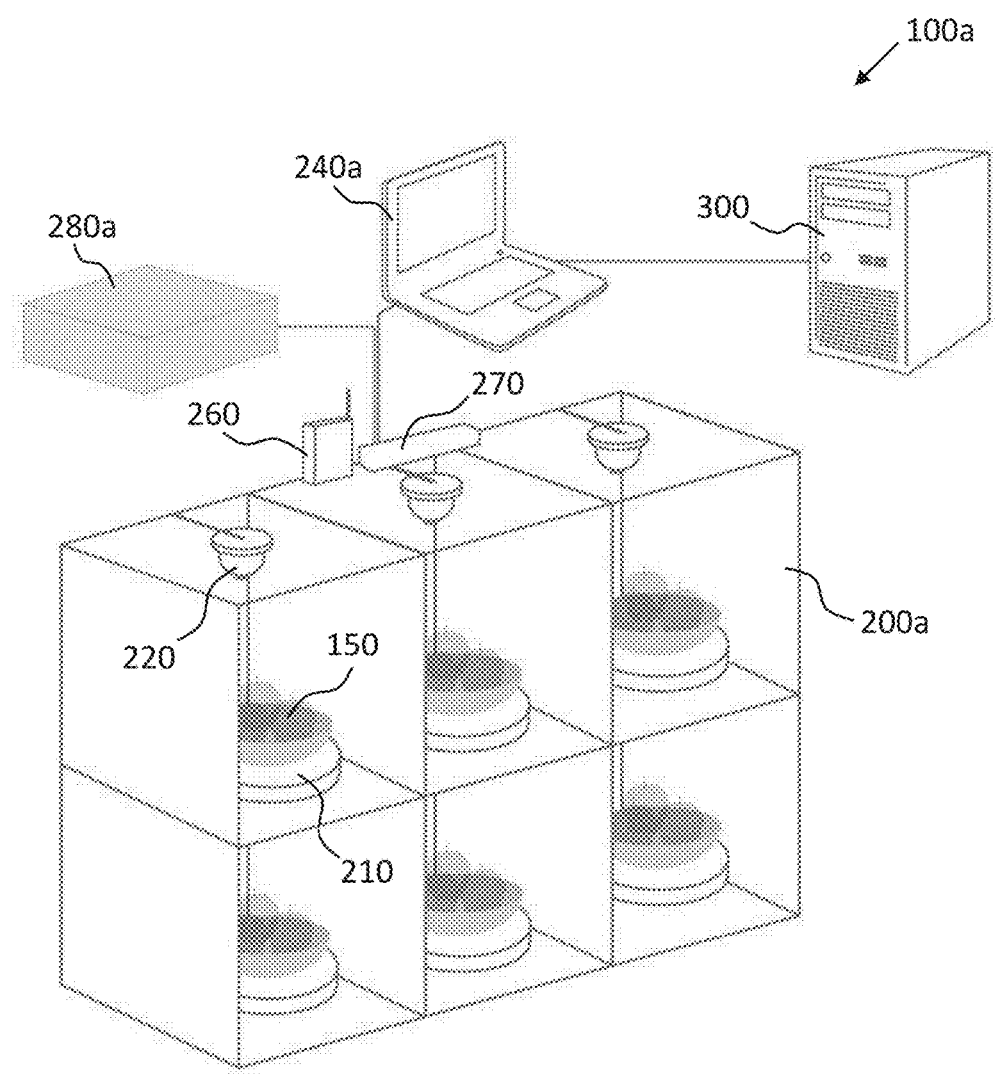
FIG. 2 This is a perspective view to illustrate a configuration of the internet direct-sales system using merchandise exhibition box of a multiple box style having a live camera of the present invention.
Figure 3:
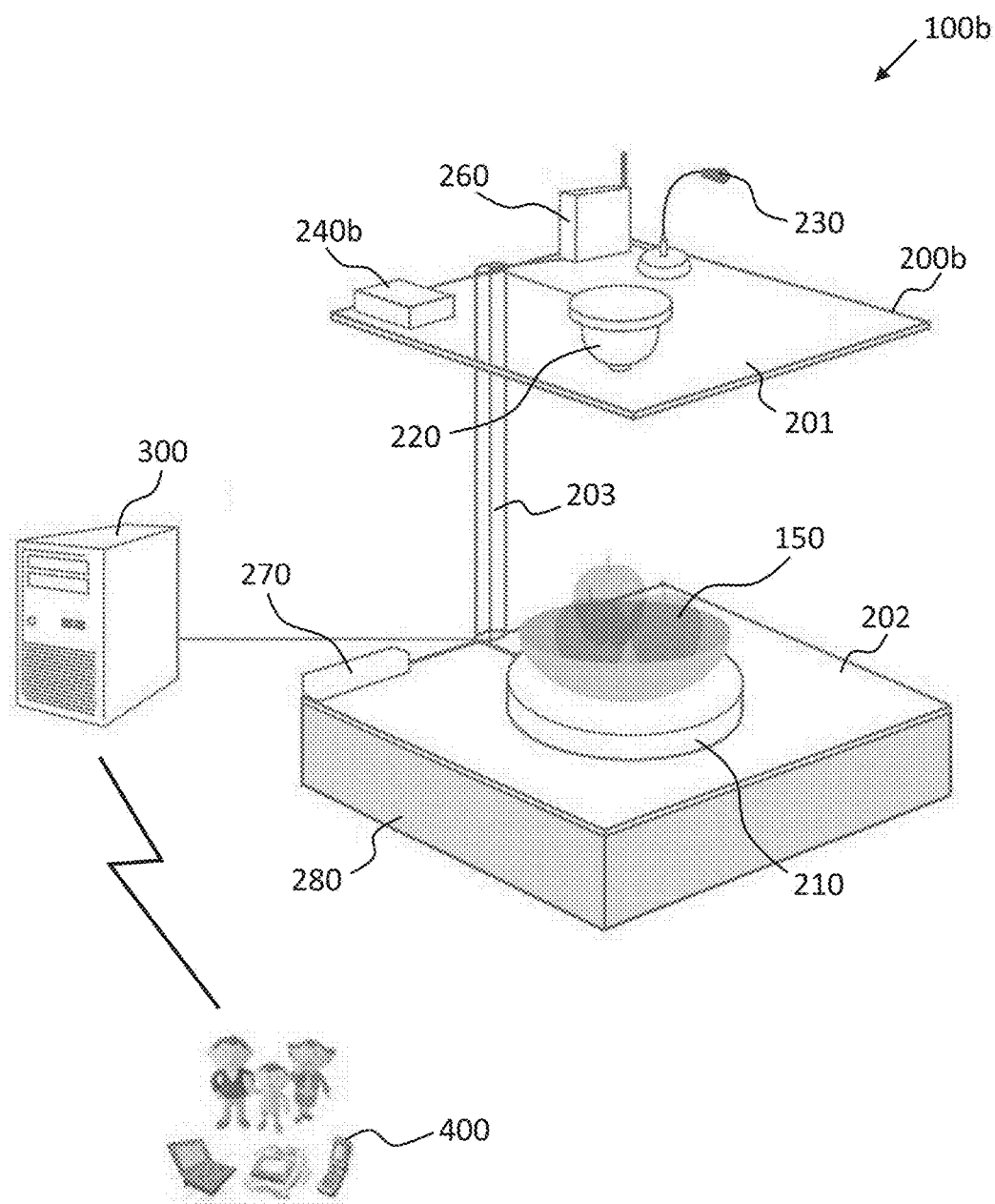
FIG. 3 This is a perspective view to illustrate a configuration of the internet direct-sales system using merchandise exhibition box of a single open box style having a live camera of the present invention.

FIG. 1 is a perspective view to illustrate the system configuration in a single box style, FIG. 2 is a perspective view to illustrate the system configuration in a multiple box style, and FIG. 3 is a perspective view to illustrate the system configuration in a single open box style.

Figure 4:
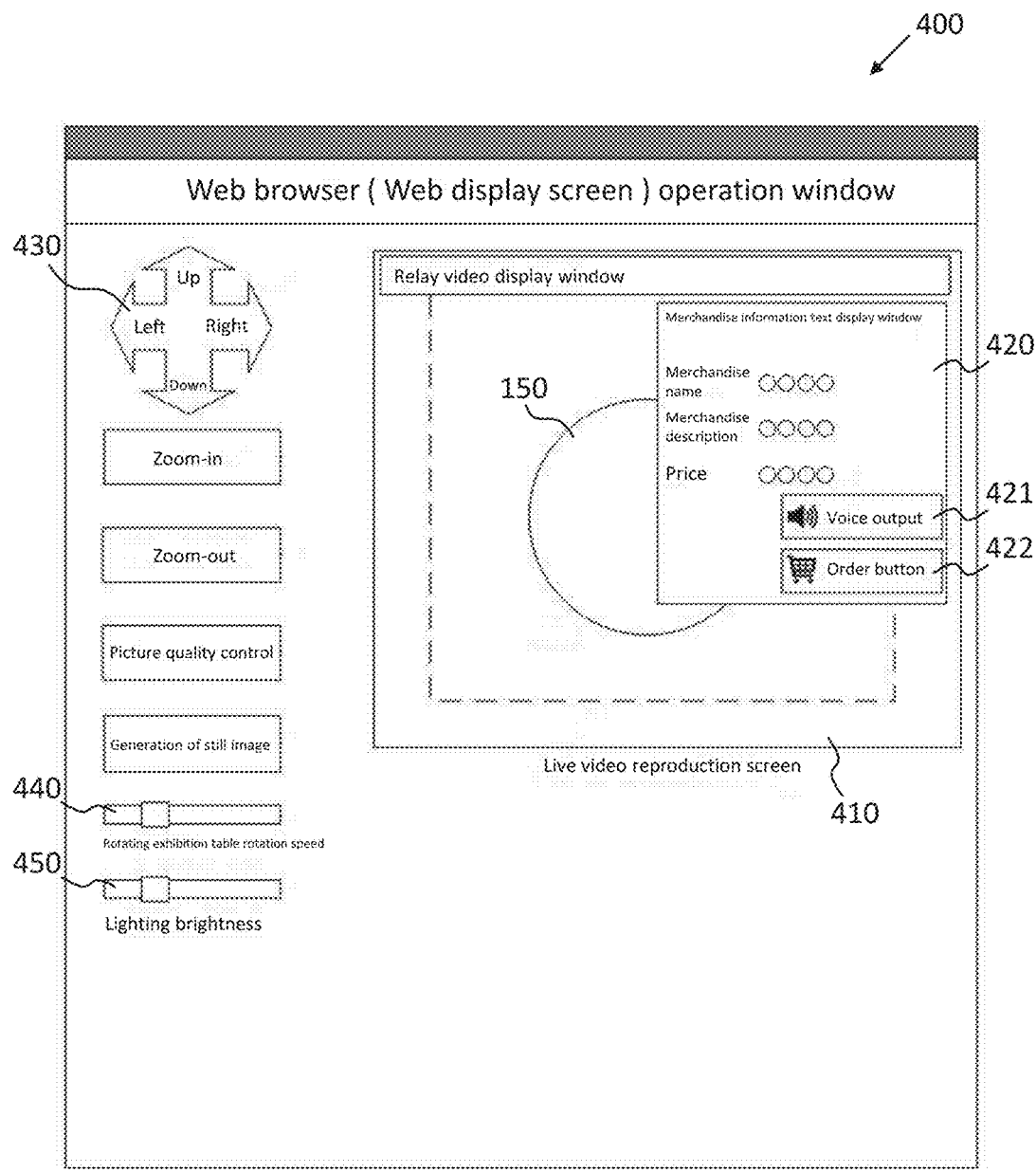
FIG. 4 This illustrates a configuration of a screen on a user computer terminal in the internet direct-sales system using merchandise exhibition box having a live camera of the present invention.

FIG. 4 is a view for describing a configuration of a screen on a user computer terminal.

As shown in FIGS. 1 to 3, an internet direct-sales systems using a merchandise exhibition box having a live camera 100, 100a, and 100b include a user computer terminal 400, a web camera 220, a rotating exhibition table 210, a lighting device 250, a live box 200, a microphone 230, a control device box 280, a web server 300, and an administrator computer terminal 240; and the system supports mail-order sales by merchandise providers who has no computer literacy.

The user computer terminal 400 is a device that general users use to browse through mail-order sales sites and apply for mail-order purchase via the Internet. The user computer terminal 400 includes devices such as a notebook personal computer (PC), a tablet PC, a mobile phone, Smartphone, which are connectable to the Internet.

The web camera 220 is a device for taking videos of a merchandise 150, a sales object, as a moving image. The web camera 220 is used to view the purchasing-desired merchandise 150 on the user computer terminal 400. It is possible to instruct the web camera 220 to change the viewing direction, angle, zooming, etc. via the Internet using the user computer terminal 400.

The rotating exhibition table 210 is a device for placing the merchandise 150 thereon to be taken by the web camera 220. The rotating exhibition table 210 is used to change the viewing direction of the merchandise 150 by the table rotation. It is possible to instruct the rotating exhibition table 210 to change the behavior such as the rotation direction and rotation speed via the Internet using the user computer terminal 400.

The lighting device 250 is a device that emits light for eased viewing the merchandise 150 placed on the rotating exhibition table 210. The lighting device 250 is used to brighten the merchandise 150. It is possible to instruct the lighting device 250 to turn on or off or change the brightness, etc. using the user computer terminal 400 via the Internet.

The live box 200, and live boxes 200a and 200b, are boxes for accommodating the merchandise 150 placed on the rotating display table 210. The live box 200 and others have a vacant space inside and have a room enough to accommodate the merchandise 150. The live box 200 and others may be made of transparent glass or plastic (acrylic, etc.) to allow visually identifying the merchandise from the outside. Further, the web camera 220 and the lighting device 250 can be installed on the live box 200 and others. The live box 200 and others may be moved to other places with the merchandise 150 accommodated, or may be moved to another place of the sale-exhibition with the box empty to place the merchandise 150 in the live boxes thereafter.

The microphone 230 is a device for inputting the voice of the merchandise provider. The microphone 230 is used to record voice for the description, price, and other related matters of the merchandise 150 placed on the rotating exhibition table 210. The microphone 230 may be connected to the administrator computer terminal 240 or connected directly to the control device box 280. Further, the microphone 230 may be attached to the live box 200 or may be a built-in microphone of such as a tablet and Smartphone.

The web server 300 is a computer device that performs processing related to the mail-order sales transaction via the Internet. The web server 300 may be the device owned by an administrator (merchandise provider) of the administrator computer terminal 240 or may be a rental server or a cloud service provided by another business entity. The web server 300 stores voice data of such as description and price of the merchandise 150 input from the microphone 230, converts the voice data into a text, and performs processing the converted text data to display in the layer-display manner on the video to be relayed, as an object different from the video. In addition, the web server 300 delivers to the user computer terminal 400 the video taken by the web camera 220, the text data of the merchandise to be displayed in the layer-display manner on that video, and the voice data of description and price of the merchandise 150 input from the microphone 230.

The merchandise information text appears on the user computer terminal 400 in a layer-display on the relayed video when the merchandise 150 displayed on the screen is clicked with a mouse; but that information text may be designed to appear at the same time when the relayed video is displayed on the user computer terminal 400.

In addition, when the merchandise 150 displayed on the screen of the user computer terminal 400 is clicked, the web server 300 makes the information text of clicked merchandise displayed on that screen; and, at the same time, acquires the image of the merchandise from the video of the merchandise 150 to store the acquired image. The merchandise image is an image of one extract frame from plural frames of the video of the merchandise 150 corresponding to the timing of clicking.

When mail-order purchase application (clicking on an ordering button 422) is received from the user computer terminal 400, a confirmation screen (a web page) appears on the user computer terminal 400; the confirmation screen displays a composite content in which the merchandise image, merchandise name, price, etc. stored in the web server 300 are combined. In addition, the web server 300 receives the mail-order purchase application from the user computer terminal 400, stores the image of the ordered merchandise together with the application information as an evidence that the merchandise 150 on the web camera 220 was purchased, and notifies the administrator computer terminal 240 this transaction.

The web server 300 sends the omnidirectional image of the merchandise 150 and the voice data to the user computer terminal 400 in real time in accordance with the instruction from the user computer terminal 400.

Administrator computer terminals 240, 240a, and 240b are apparatuses that receive the description of the merchandise and the price in voice input from the microphone 230, register the received particulars in the web server 300, and check the result of the processing performed by the web server 300. The administrator computer terminals 240 and others are used to establish the mail-order sales of the merchandise 150 on behalf of a merchandise provider who has no computer literacy. The administrator computer terminals 240 and others may be provided in the live box 200 or the like.

The administrator computer terminals 240, 240*a*, and 240*b* may be severally provided for computer administrators who specializes in managing the mail-order sales and for merchandise providers who handle accommodating the merchandise 150 in the live box 200 and registering the merchandise information. In addition, the administrator computer terminals 240, 240*a*, and 240*b* for the computer administrator may be installed in a place remote from the installation location of the live box 200 and similar devices.

A communication device 260 is a device for connecting the administrator computer terminal 240 and the server in the control device box 280 to a computer network such as the Internet. For example, a router establishes a communication route by selecting and relaying plural different networks. The communication device 260 and the administrator computer terminal 240 may communicate via wired communication or instead may communicate via wireless communication.

A power supply 270 supplies power to each device attached to the live box 200. For example, an AC power supply and a dry battery (DC power supply) are included. A secondary battery, which can be repeatedly used by charging, may be used to allow securing power even when the live box 200 is moved.

Control device boxes 280 and 280*a* are boxes which secure accommodation spaces separately from the live box 200 and others. The control device boxes 280 and others are provided to accommodate: a server for processing a web camera video/sound, an IP device control server, a signal control device of the web camera 220 and the microphone 230, an operating control device of the rotating exhibition table 210 and the lighting device 250, and the like. Note that the communication device 260 and the power supply 270 may be accommodated in the control device boxes 280 and others.

As shown in FIG. 1, the internet direct-sales system using a merchandise exhibition box of a single box style having a live camera 100 deals in one item of the merchandise 150 as the object of the mail-order sales item with one live box 200. In the live box 200, the front or other suitable side may be opened in order to put in and take out the merchandise 150, or a door may be provided. The control device box 280 may be attached to the lower side of the live box 200 and others so that it can be moved together with the live box 200.

The pertinent merchandise providers are mainly persons who desire to sell the merchandise 150 of their own on the mail-order sales, but are not able to prepare equipment for the mail-order sales by themselves. For ease of operation, the administrator computer terminal 240 may be a tablet PC, Smartphone, or a similar device having a touch-panel, a voice input function, or other similar function.

The merchandise provider puts the merchandise 150 in the live box 200 and instructs the administrator computer terminal 240 the processing of starting the mail-order sales of the merchandise 150. It should be noted that when the merchandise 150 is sensed by the web camera 220 or another sensor, etc., the administrator computer terminal 240 may ask the merchandise provider for confirmation that the mail-order sales of the merchandise 150 is to start. The merchandise provider inputs information (for example, quantity, price, etc.) of the merchandise 150 from the microphone 230 in voice.

The administrator computer terminal 240 instructs the web server 300 to register the merchandise 150 as mail-order sales object. The web server 300 delivers the information of the merchandise 150 registered via the Internet to the user computer terminal 400.

The administrator computer terminal 240 is for registering the merchandise 150 in the web server 300 and for managing the mail-order sales. When the registration of the merchandise 150 completes, the power to the administrator computer terminal 240 can be turned off because the web server 300 is always in operation.

When a general user instructs, from the user computer terminal 400, the system to confirm the voice information of the merchandise 150, the web server 300 transmits the information of the merchandise 150 given by voice to the user computer terminal 400. Further, when an operation instruction is given to the web camera 220, the rotating display rotating 210, and the lighting device 250 from the user computer terminal 400, the web server 300 instructs the control device box 280 to perform such instructed operation.

When a general user notifies the web server 300, via the user computer terminal 400, that the merchandise 150 is ordered, then the web server 300 makes the user computer terminal 400 display a confirmation screen that asks the general user for confirmation of the purchase of the merchandise 150. When a general user notifies the web server 300, via the user computer terminal 400, that the purchasing of the merchandise 150 is decided, then the web server 300 notifies the administrator computer terminal 240 that the purchase and sale of the merchandise 150 is established.

The web server 300 may be configured to allow displaying the merchandise being sold out when orders from the user computer terminal 400 reach the stock amount, by providing an inventory management system registering in advance the stock amount of the merchandise 150.

As shown in FIG. 2, the internet direct-sales system using merchandise exhibition box of multiple box style having a live camera 100*a* targets a plurality of merchandise 150 as objects of the mail-order sales using a live box 200*a* having multiple accommodation space. In each accommodating space of the live box 200*a*, the web camera 220, the rotating exhibition table 210, and other related items are installed. It should be noted that providing one control device box 280*a* is enough and it is not necessary to provide severally on each accommodating space. For the administrator computer terminal 240*a*, it is sufficient to prepare one notebook PC or a similar device to manage each accommodating space. The administrator computer terminals 240*a* may be severally provided for computer administrators who specializes in managing the mail-order sales and for merchandise providers who handle accommodating the merchandise 150 in the live box 200 and registering the merchandise information.

The live box 200*a* may be comprised of a plurality of single style live box 200 arrayed vertically and horizontally, or may be one large single box inside of which is partitioned into multiple spaces. The lighting device 250 may be not necessary to be installed as long as another lighting means such as room lighting is available. Installing one microphone 230 is enough as long as each of accommodating spaces can be identified by the administrator computer terminal 240*a* or other devices.

The single box style live box 200 is suitable for supporting mail-ordering of the merchandise 150 by giving the box to each of the merchandise providers and the multiple box style live box 200 is suitable for supporting mail-ordering by installing in a place where merchandise providers get together.

As shown in FIG. 3, the internet direct-sales system using single open box style merchandise exhibition box having a live camera 100b deals in one item of the merchandise 150 or a set of plural merchandise 150 bundled in one basket, as the mail-order sales object in one live box 200b; the side of the live box 200b is open. For example, a support column 203 is erected from a lower plate 202 on which the rotating exhibition table 210 is mounted and supports the upper plate 201 on which the web camera 220 and related device are to be installed. A space for accommodating the merchandise 150 is secured between the upper plate 201 and the lower plate 202. A transparent acrylic plate or similar material may be used for the upper plate 201 and the lower plate 202, and a stainless steel or similar material may be used for the column 203.

When the system is installed at a place where merchandise providers get together, many product providers put the merchandise 150 in the live box 200b one after another. Since some merchandise providers are not accustomed to the operation of the administrator computer terminal 240b, the system administrator may also input information on or related to the merchandise 150. In addition, it may be practical for the system operation practice to employ a method of button operation only or other method easy-to-memorize for the merchandise provider.

The single box style live box 200 is suitable for cases where the box is often carried with the merchandise 150 being accommodated and the open box style live box 200b is suitable for cases where replacement of the merchandise 150 is frequent, or where the merchandise 150 is too long to be accommodated in a closed box.

As shown in FIG. 4, when the merchandise 150 is registered on the web server 300 and a general user enters a URL of the web site display screen of the mail-order sales site at the user computer terminal 400, the user computer terminal 400 displays a video display screen 410, a merchandise information display screen 420, a video control button 430, a rotating exhibition table control button 440, a lighting control button 450, etc. On the video display screen 410, the video image of the merchandise 150 is displayed in real time; and on the merchandise information display screen 420, the information of the merchandise 150 (product name, item description, price etc.) input by the voice of merchandise providers and converted into text are displayed. Further, on the merchandise information display screen 420, a sound output button 421 and an order button 422 are displayed.

The video control button 430 performs operations such as changing the direction (vertical and horizontal, and right and left directions) of the web camera 220, enlarging (zooming in) or reducing (zooming out) the image, adjusting the picture quality of the video, creating a still image, and other image or video manipulation operations. When the web camera 220 takes the merchandise 150 from directly above, the position of the web camera 220 may be fixed and the angle may be tilted, or the web camera 220 may be moved so as to pivot around the merchandise 150.

The rotating exhibition table control button 440 controls behavior of the rotating exhibition table 210 such as changing rotation speed. The lighting control button 450 controls the lighting device 250 for such as changing the brightness. When these control buttons are operated, a control instruction is transmitted from the web server 300 to the control device box 280 via the Internet. An IP device control server 282 (see FIG. 5), etc. in the control device box 280 operates corresponding device based on the transmitted instruction, making it possible to check the video of the merchandise 150 up to a fine portion from all directions.

The merchandise information text transmitted from the web server 300 is displayed on the web site display screen when the merchandise 150 on the relayed video display screen 410 is selected with the mouse. In addition, when the merchandise 150 is selected with the mouse, an image is acquired from the video and the image of the merchandise 150 is stored in the web server 300. The merchandise information text is displayed within the picture frame of the relayed video display screen 410; however, it may be displayed in any place within the web site display screen. Further, the product information text may be displayed simultaneously with the displaying of the relay video display screen 410. In addition, the acquisition of the image of the merchandise 150 from the video may be performed when the order button 422 is selected.

The sound output button 421 instructs the web server 300 to output sound. That is, the information of the merchandise 150 input by the merchandise provider or the system administrator in voice is reproduced. It should be noted that not only the prerecorded voice is reproduced but also it may be configured that a direct talk is available between the general user and the merchandise provider or the system administrator.

The order button 422 notifies the system that a general user orders the merchandise 150. When the order button 422 is pressed, the web server 300 creates mail-order sales confirmation screen combining the image of the merchandise 150 and the text information of the merchandise which are stored in the web server 300; and the web server 300 makes the user computer terminal 400 display the confirmation screen.

By creating a confirmation screen in which the merchandise 150 on the video display screen 410 is imaged, a general user can print and retain the confirmation screen. The mail-order sales manager can satisfy the requirement for mail-order sales by storing in the web server 300 the sales information including the image of the merchandise 150 and the date and time of image acquisition; and this prevents troubles in mail-order sales.

{Embodiment 2}

Next, the control of the internet direct-sales system using a merchandise exhibition box having a live camera according to the present invention will be described.

Figure 5:
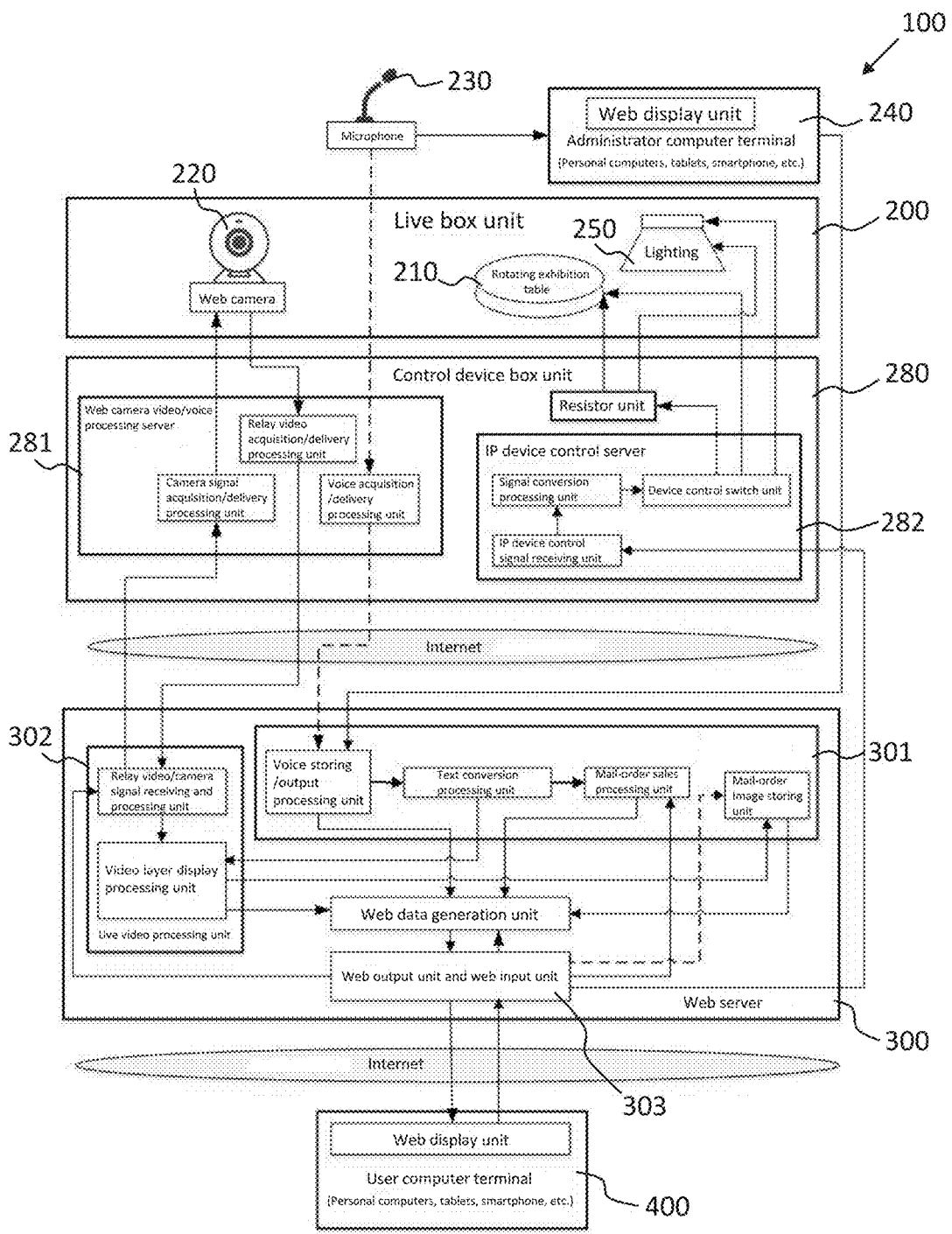
FIG. 5 This is a block diagram to describe the control scheme of the internet direct-sales system using merchandise exhibition box having a live camera of the present invention.

FIG. 5 is a block diagram for describing the control of each device.

Figure 6:
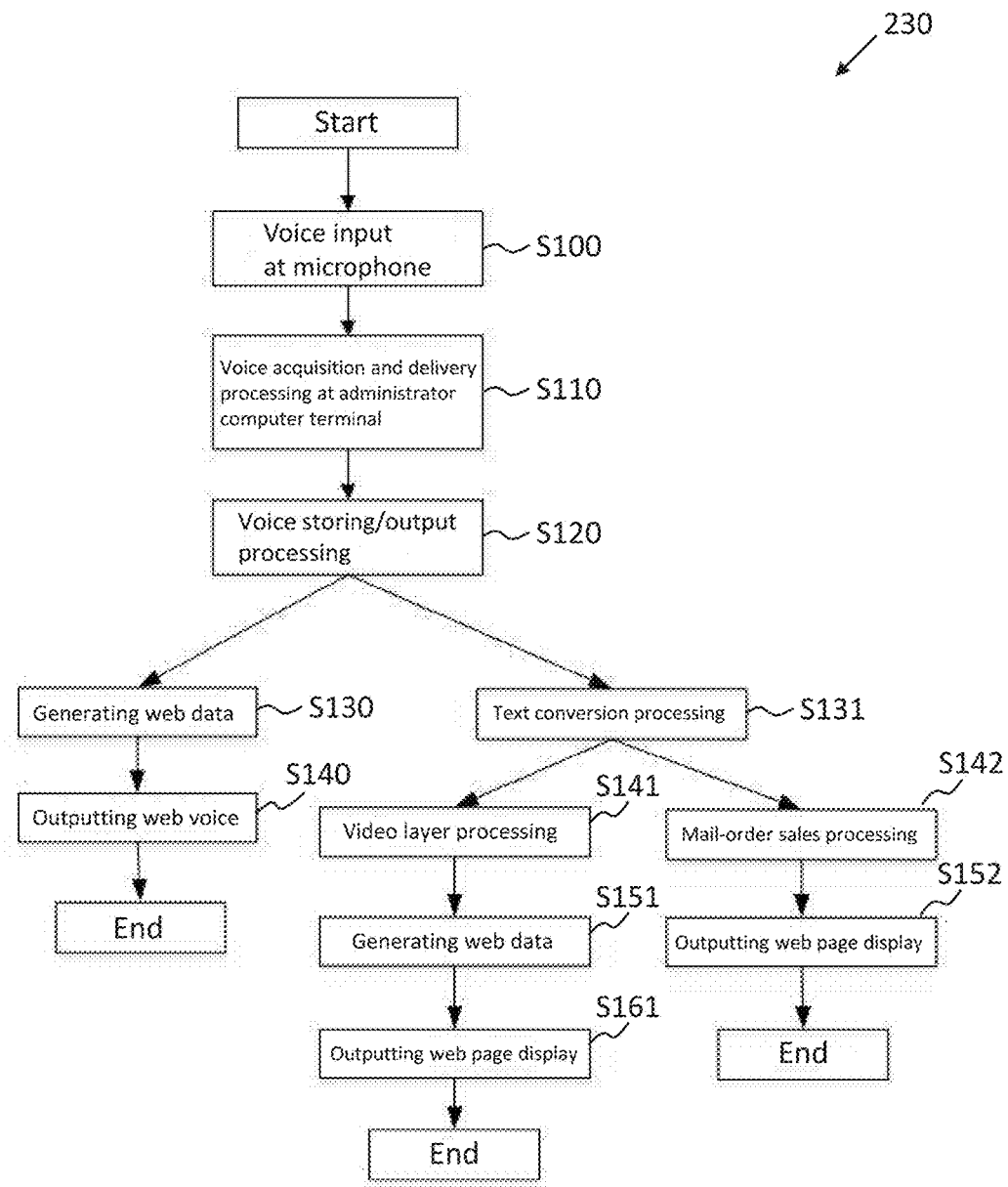
FIG. 6 This is a flowchart to describe the flow of the microphone signal processing in the internet direct-sales system using merchandise exhibition box having a live camera of the present invention.

FIG. 6 is a flow chart for describing the flow of the microphone signal processing.

Figure 7:
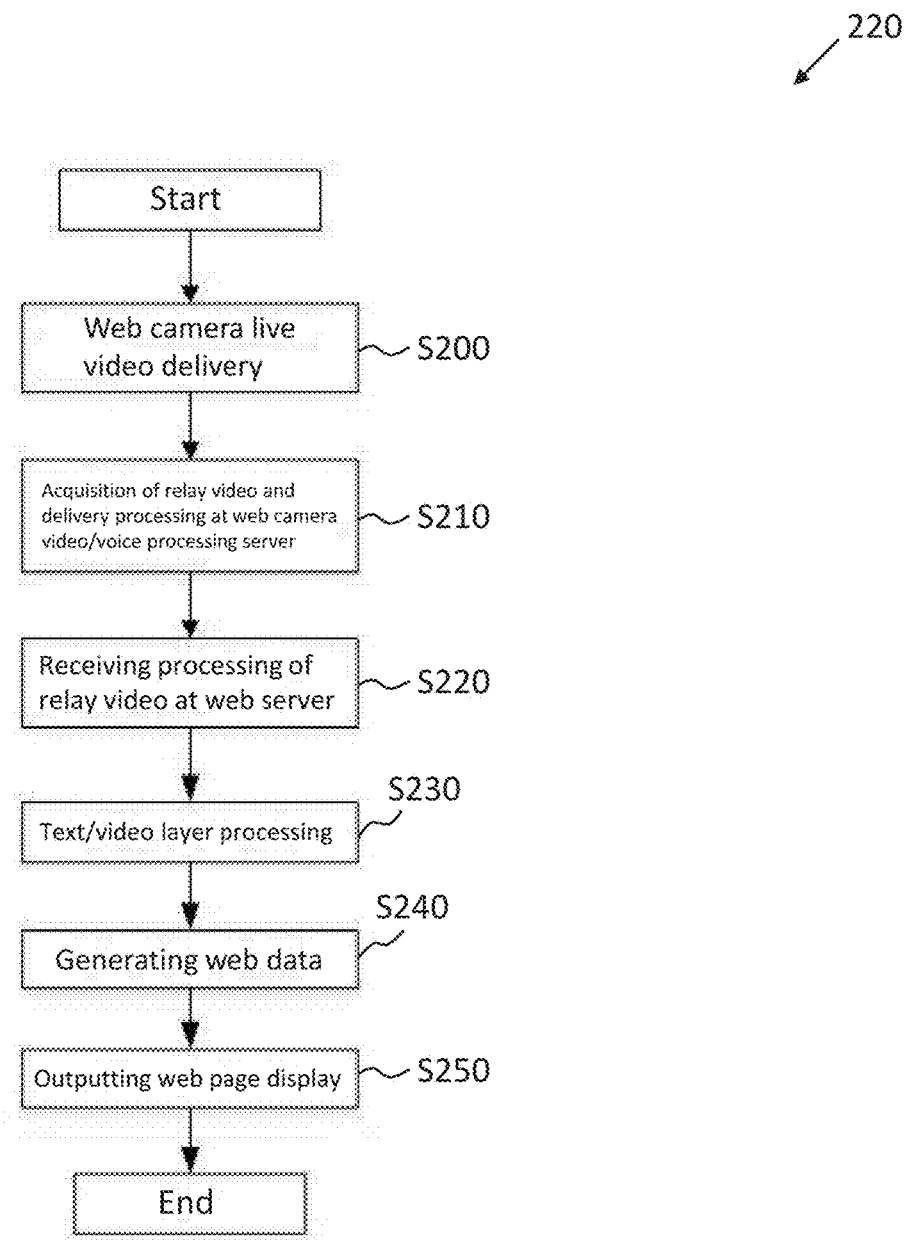
FIG. 7 This is a flowchart to describe the flow of the processing in delivery of the video taken by a web camera in the internet direct-sales system using merchandise exhibition box having a live camera of the present invention.

FIG. 7 is a flow chart for describing the flow of the processing in delivery of the video taken by web camera.

Figure 8:
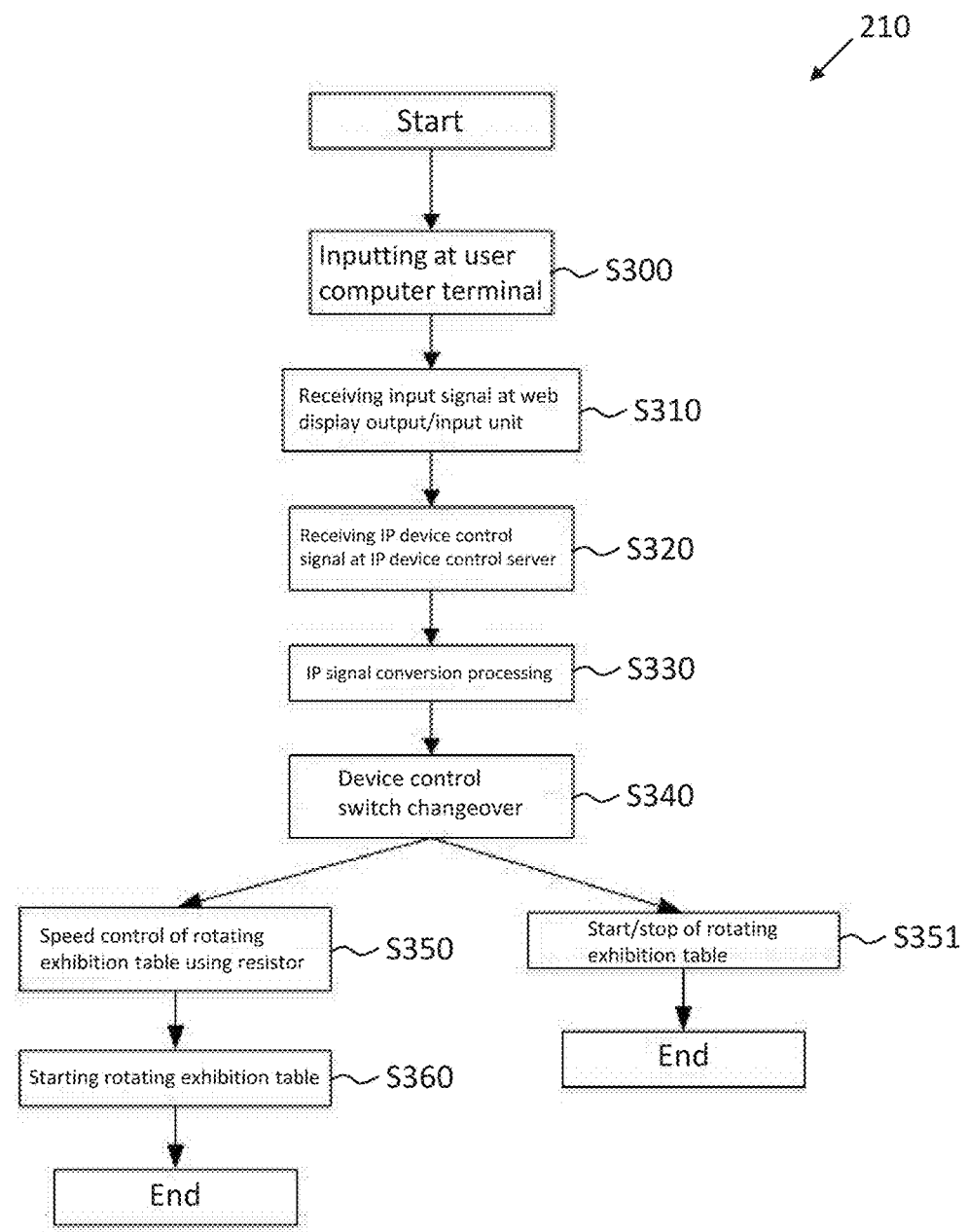
FIG. 8 This is a flowchart to describe the flow of the processing of the control signal to a rotating exhibition table in the internet direct-sales system using merchandise exhibition box having a live camera of the present invention.

FIG. 8 is a flow chart for describing the flow of the processing of the control signal to a rotating exhibition table.

Figure 9:
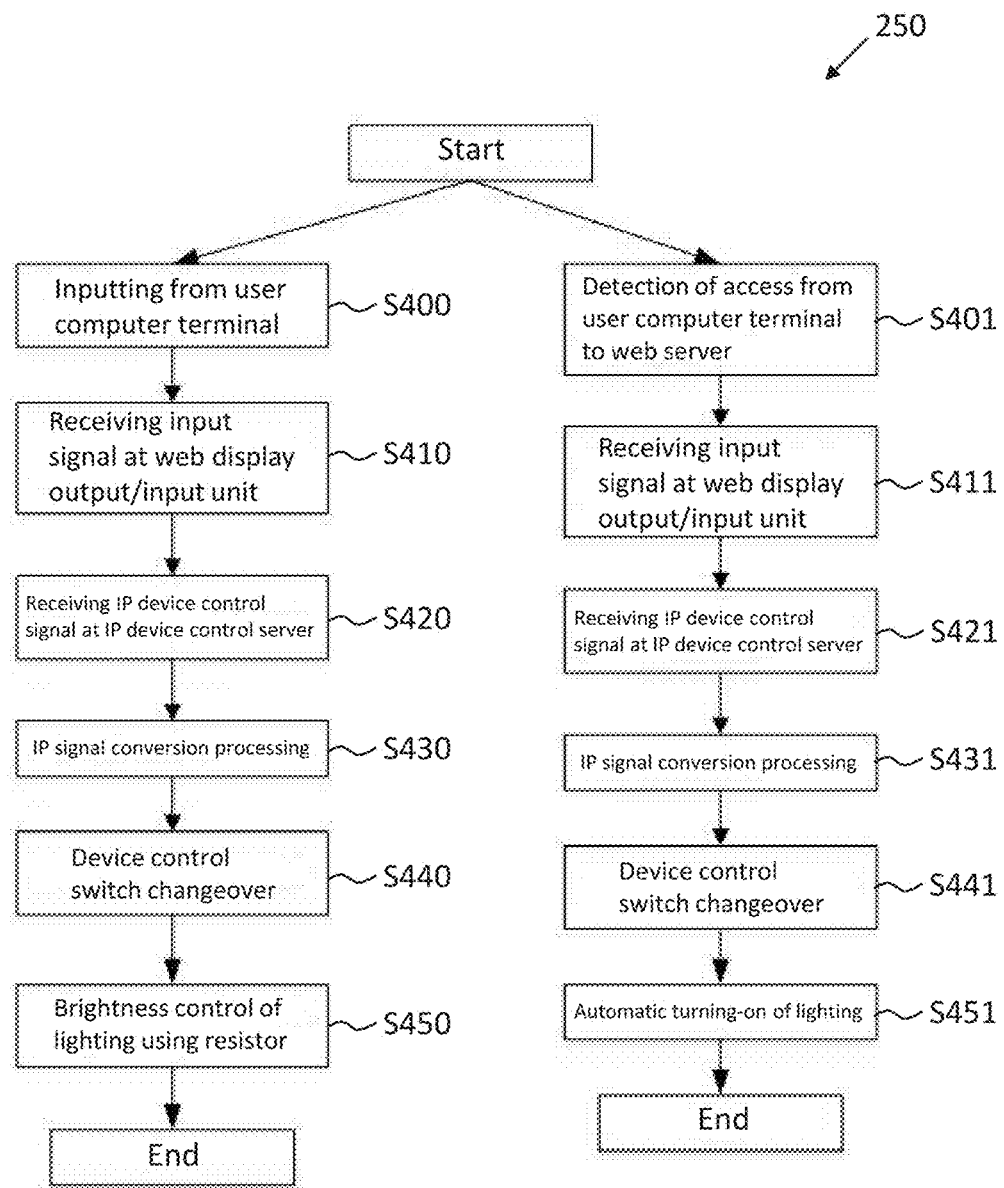
FIG. 9 This is a flowchart to describe the flow of the processing of the control signal to a lighting device in the internet direct-sales system using merchandise exhibition box having a live camera of the present invention.

FIG. 9 is a flow chart for describing the flow of the processing of the control signal to a lighting device.

Figure 10:
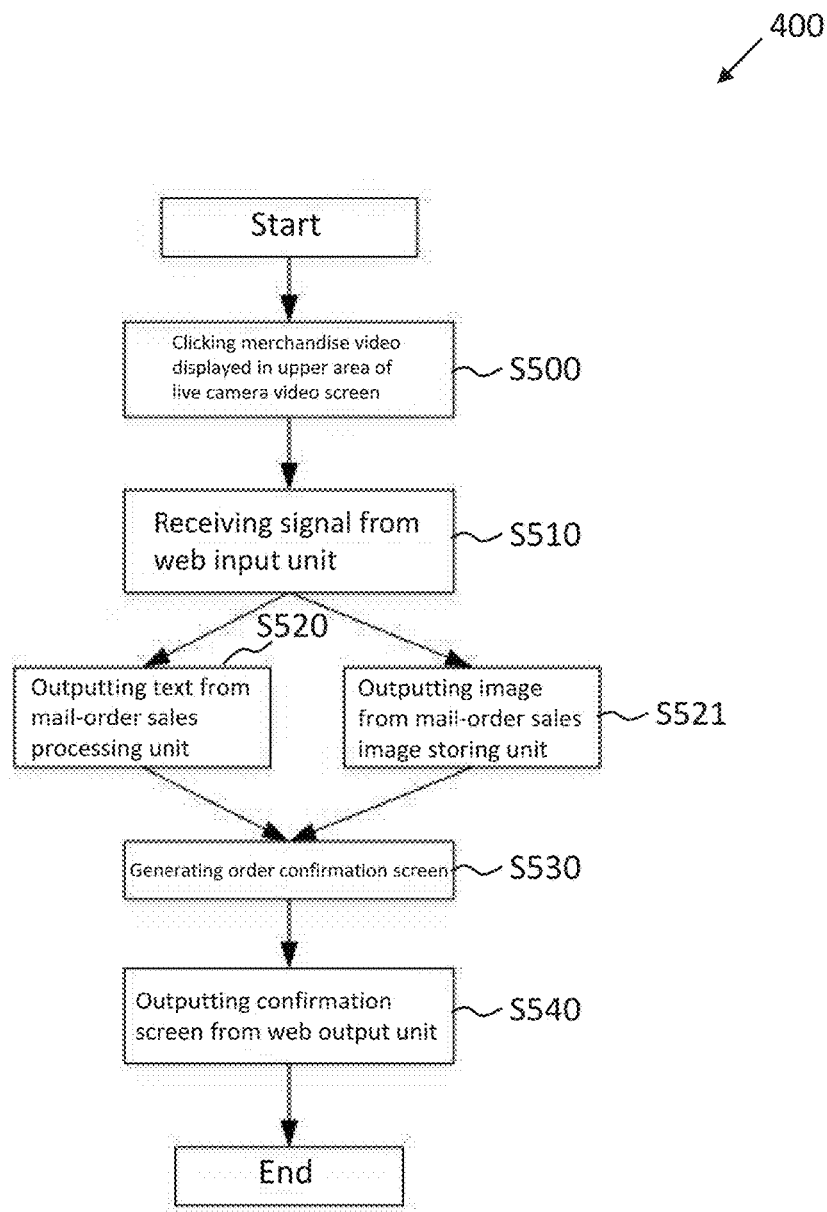
FIG. 10 This is a flowchart to describe the flow of the processing for generating a mail-order sales confirmation screen in the internet direct-sales system using merchandise exhibition box of single box style having a live camera of the present invention.

FIG. 10 is a flow chart for describing the flow of the processing for generating a mail-order sales confirmation screen in the single box style.

Figure 11:
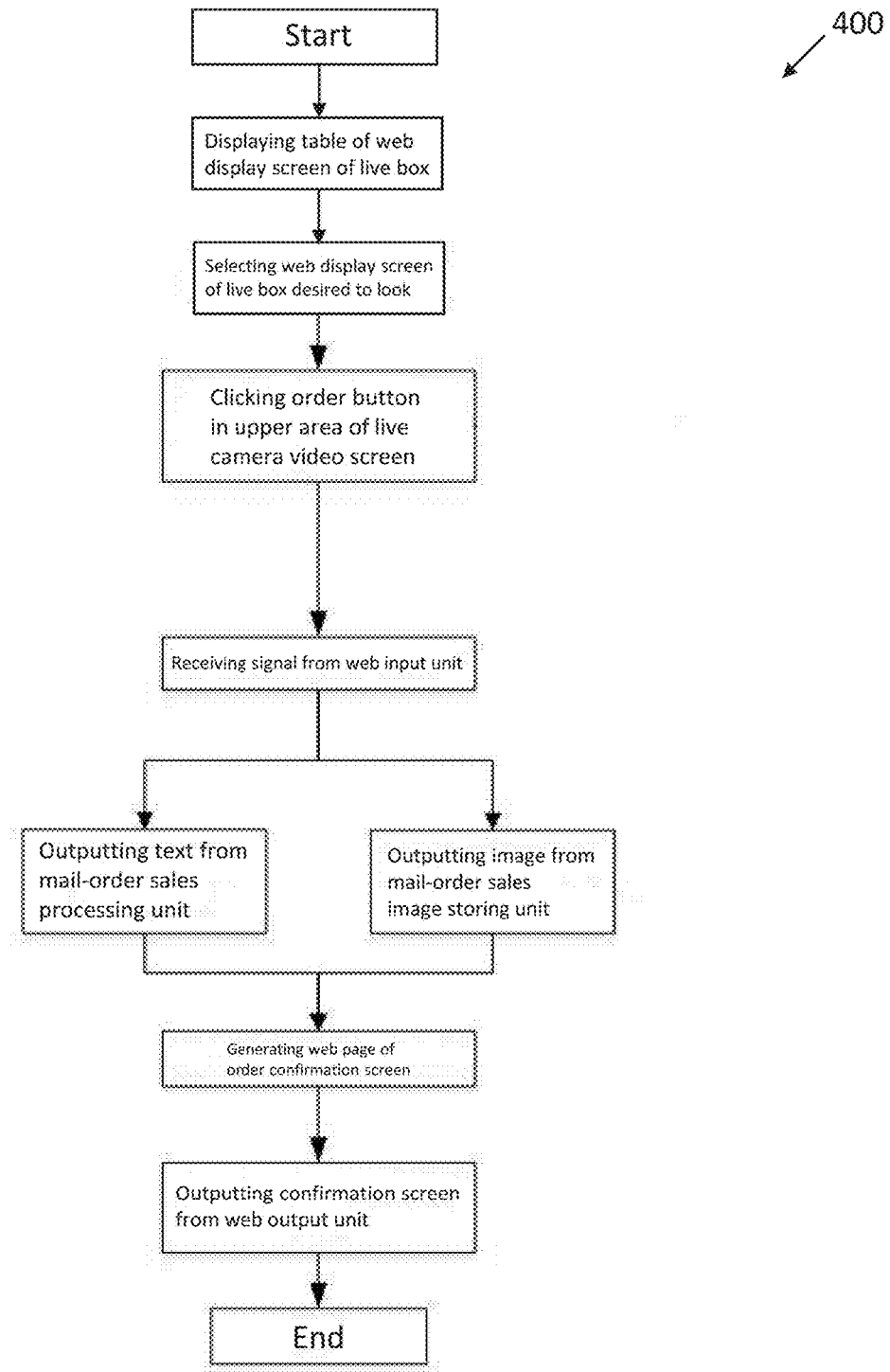
FIG. 11 This is a flowchart to describe the flow of the processing for generating a mail-order sales confirmation screen in the internet direct-sales system using merchandise exhibition box of multiple box style having a live camera of the present invention.

FIG. 11 is a flow chart for describing the flow of the processing for generating a mail-order sales confirmation screen in the multi box style.

As shown in FIG. 5 and FIG. 6, when the merchandise provider enter voice to the microphone 230 (Step S100), the administrator computer terminal 240 acquires the voice and delivers that voice to the web server 300 via the Internet (Step S110). Then, the web server 300 stores the received voice in a management unit 301 (Step S120).

The web server 300 creates web data for outputting the voice (Step S130); and the management unit 301 analyzes the input voice and converts into text (Step S131). When the sound output button 421 is pressed, the web data is delivered from an input/output unit 303 to the user computer terminal 400 via the Internet, and the sound is output (Step S140).

The information of the merchandise 150 analyzed on the basis of the sound is sent to a video processing unit 302 (Step S141). The image processing unit 302 generates web data (layer display data) for displaying text as an object different from the image while reproducing the video (Step S151) and delivers from the input/output unit 303 to the user computer terminal 400 via the Internet; and the video display screen 410 and the information display screen 420 are displayed (Step S161).

Further, the information of the merchandise 150 analyzed on the basis of the voice is generated as a mail-order sales confirmation screen (step S142) when the order button 422 is pressed, and is delivered from the input/output unit 303 to the user computer terminal 400 via the Internet (Step S152).

As shown in FIG. 5 and FIG. 7, when a general user enters, into the web browser of the user computer terminal 400, the URL of the web display screen (see FIG. 4) with which the video of the merchandise 150 is delivered, the web camera 220 delivers the video of the merchandise 150 to a video/audio processing device 281 in the control device box 280 (Step S200), and the video/audio processing device 281 delivers the received video to the web server 300 via the Internet (Step S210).

The web server 300 receives the video at the video processing unit 302 (Step S220) and applies the process to treat the text of the merchandise information as a layer on the video (Step S230), and then, creates the web data for displaying the video display screen 410 (Step S240) to deliver the created data to the user computer terminal 400 from the input/output unit 303 via the Internet (Step S250).

As shown in FIG. 5 and FIG. 8, when a general user gives an instruction to the rotating exhibition table 210 on its rotation from the user computer terminal 400 (Step S300), the instruction is received by the input/output unit 303 of the web server 300 via the Internet (Step S310). The input/output unit 303 then delivers the instruction to the IP device control server 282 in the control device box 280 via the Internet, and the IP device control server 282 in the control device box 280 receives (S320) the instruction.

The IP device control server 282 converts (digital-analog conversion, for example) the signal of the received instruction (Step S330) and switches the object of control to the rotating exhibition table 210 (Step S340); where the instruction is speed adjustment, the resistor and a related element are set (Step S350) so that the rotating exhibition table 210 rotates at the instructed speed (Step S360), further, where the instruction is to make a stop, the rotation of the rotating exhibition table 210 will be stopped (Step S351).

As shown in FIG. 5 and FIG. 9, when a general user gives an instruction on the adjustment of the brightness of the lighting device 250 from the user computer terminal 400 (Step S400), the instruction is received at the input/output unit 303 of the web server 300 via the Internet (Step S410). Then, the input/output unit 303 delivers the received instruction to the IP device control device server 282 of the control device box 280 via the Internet and the IP device control server 282 in the control device box 280 receives the instruction (Step S420). The IP device control server 282 converts the received instruction signal (Step S430) and switches the object of control to the lighting device 250 (Step S440), and then the resistor and a related element are set (step S450) so that the lighting becomes at the instructed brightness.

When the user computer terminal 400 attempts to access to the web server 300 regarding the merchandise 150 (Step S401), the input/output unit 303 accepts the access (Step S411) and transmits an instruction to the IP device control server 282 of the control device box 280 from the input/output unit 303. On receipt by the IP device control server 282 of the instruction (Step S421), the signal of the received instruction is converted (Step S431) and the object of control is switched to the lighting device 250 (Step S441) to automatically turn on the lighting device 250 (Step S451).

As shown in FIG. 5 and FIG. 10, in the case of a single box style configuration, when the general user presses the order button 422 on the screen displayed on the user terminal 400 (Step S500), the button-pressing signal is received at the input/output unit 303 of the web server 300 (Step S510) via the Internet. On reception of the signal, the information of the merchandise 150 converted into text at the management unit 301 is acquired (Step S520) and the video stored in the management unit 301 is acquired (Step S521); then the acquired text-converted merchandise information and the fetched video are combined into the mail-order sales confirmation screen (Step S530). Then, the input/output unit 303 transmits a confirmation screen to the user computer terminal 400 via the Internet (Step S540).

As shown in FIG. 2, FIG. 5, and FIG. 11, the web site display screen (see FIG. 4) includes different access URLs for each box in the case of a multiple box style configuration. Therefore, a table of web display screens prepared separately is displayed on the user computer terminal to allow the user to select the web display screen of the box that the user desires to have a look. Browsing subsequent to this is the same procedure as the one in the single box style configuration.

As stated above, the internet direct-sales system using a merchandise exhibition box can give supports in operating mail-order sales over the Internet to a merchandise provider who has no shops and to a merchandise provider who does not have sales means due to the information gap. In the system, moving or carrying the live box 200 is easy; therefore, the system can be used in any place as long as the power supply 270 and the Internet lines are available. This means that the sales of agricultural products and merchandise of a farmer or of the direct-sales shops of agricultural products can be promoted even if the shops are being lost due to disasters such as tsunamis or floods.

That the relaying the video of the merchandise 150 in real time using the web camera 220 eliminates the need of performing such as image processing and updating the website, and promotes the mail-order sales of the direct-sales shop of agricultural products over the Internet. In addition, the user can check the information of the merchandise 150 in real time by video, sound, etc.

Delivering the information of the merchandise 150 in the direct-sales shop of agricultural products over the Internet makes it possible to provide residents near the direct-sales shop of the agricultural products with the information, and might give them an opportunity for immediate visiting the direct-sales shop. It is also effective for promoting a program for dissolving the vacant shop problem in a shopping street, or for sales promotion of a rent-shelf business in a regional community business plan.

Since description and price of the merchandise 150 can be easily set in voice, the invented system eliminates the digital divide of farmers and small businesses and improves their computer literacy leading to the promotion of the information communication technology (ICT) utilization.

Although the embodiments of the present invention have been described above, the present invention is however not limited thereto. For example, even in the case of the internet direct-sales system using merchandise exhibition box of a single box style having a live camera 100, a plurality of merchandise 150 may be accommodated in the live box 200, allowing selecting the merchandise 150 to order using the user computer terminal 400.

DESCRIPTION OF THE REFERENCE NUMERALS

100, 100a, 100b: Internet direct-sales system using a merchandise exhibition box having a live camera
150: Merchandise
200, 200a, 200b: Live box
201: Upper plate
202: Lower plate
203: Column
210: Rotating exhibition table
220: Web camera
230: Microphone
240, 240a, 240b: Administrator computer terminal
250: Lighting device
260: Communication device
270: Power supply
280, 280a: Control device box
281: Video/audio processing device
282: IP device control server
300: Web server
301: Management unit
302: Video processing unit
303: Input/output unit
400: User computer terminal
410: Video display screen
420: Merchandise information display screen
421: Sound output button
422: Order button
430: Video control button
440: Rotating exhibition table control button
450: Lighting control button

The invention claimed is:

1. An internet direct-sales system using a merchandise exhibition box having a live camera comprising:
a user computer terminal for making an application for mail-order purchase via the Internet;
a web camera that takes a video of merchandise based on an instruction received from the user computer terminal via the Internet;
a rotating exhibition table for placing thereon merchandise to be taken by the web camera, wherein the table rotates based on an instruction received from the user computer terminal via the Internet;
a lighting device that emits light based on an instruction received from the user computer terminal via the Internet so as to make it easier to view the merchandise placed on the rotating exhibition table;
a live box having a space for accommodating the merchandise placed on the rotating exhibition table, the live box being for attaching the web camera and the lighting device;
a microphone attached to the live box for receiving an input to record the description and the price of the merchandise on the rotating exhibition table in voice;
a web server that delivers data to the user computer terminal on reception of an application for mail-order purchase from the user computer terminal and performs processing related to the mail-order purchase received from the user computer terminal,
wherein the data includes the video of the merchandise taken by the web camera, the sound input from the microphone, and the merchandise information in a text form converted from the voice input; and an administrator computer terminal installed on the live box for checking the result of the processing performed by the web server;
wherein the administrator computer terminal registers merchandise accommodated in the live box placed at a freely-chosen place as an object of the mail-order sales and provides the omnidirectional video of the merchandise and the audio in real time to the user computer terminal in accordance with the instruction from the user computer terminal, the system thereby supports mail-order sales operated by a merchandise provider who lacks the computer literacy or mail-order sales that uses a portable live camera.

2. The internet direct-sales system using a merchandise exhibition box having a live camera according to claim 1, wherein the live box is arranged in plural or partitioned into a plurality of spaces so that a plurality of merchandise are registered in the web server as objects for mail-order sales.

3. The internet direct-sales system using a merchandise exhibition box having a live camera according to claim 1, wherein the live box is such that a part of the side face is open.

4. The internet direct-sales system using a merchandise exhibition box having a live camera according to claim 1, wherein the web server converts the voice input from the microphone into text to create merchandise information and causes the user computer terminal to display the merchandise information together with the video taken by the web camera.

5. The internet direct-sales system using a merchandise exhibition box having a live camera according to claim 4, wherein, when the web server receives an instruction for purchasing merchandise from the user computer terminal, the web server acquires an image from the video taken by the web camera and combines the acquired image with the merchandise information to create an order information, and displays the information on the user computer terminal.

* * * * *